(12) United States Patent
Hsuan

(10) Patent No.: US 7,020,624 B2
(45) Date of Patent: Mar. 28, 2006

(54) NETWORK SERVER FOR SERVICING ARTICLES OF WEAR

(75) Inventor: John Hsuan, Hsin-Chu (TW)

(73) Assignee: United Microelectronics Corp., Hsin-Chu (TW)

( * ) Notice: Subject to any disclaimer, the term of this patent is extended or adjusted under 35 U.S.C. 154(b) by 645 days.

(21) Appl. No.: 09/789,847

(22) Filed: Feb. 22, 2001

(65) Prior Publication Data

US 2002/0116240 A1   Aug. 22, 2002

(51) Int. Cl.
*G06F 17/60* (2006.01)

(52) U.S. Cl. .......................... 705/26; 705/37; 700/213; 700/219

(58) Field of Classification Search ................. 705/26, 705/37; 700/213
See application file for complete search history.

(56) References Cited

U.S. PATENT DOCUMENTS

| | | | | |
|---|---|---|---|---|
| 4,159,531 A | * | 6/1979 | McGrath | 701/35 |
| 5,499,466 A | * | 3/1996 | House | 40/322 |
| 5,705,977 A | * | 1/1998 | Jones | 340/457.2 |
| 6,010,239 A | * | 1/2000 | Hardgrave et al. | 700/213 |
| 6,463,940 B1 | * | 10/2002 | Thomas et al. | 134/56 R |
| 2001/0049846 A1 | * | 12/2001 | Guzzi et al. | 8/158 |
| 2002/0073012 A1 | * | 6/2002 | Lowell et al. | 705/37 |
| 2002/0186249 A1 | * | 12/2002 | Lu et al. | 345/781 |
| 2003/0208454 A1 | * | 11/2003 | Rienhoff et al. | 707/1 |

FOREIGN PATENT DOCUMENTS

DE          3320419 A1 * 12/1984

* cited by examiner

*Primary Examiner*—Firmin Backer
(74) *Attorney, Agent, or Firm*—Winston Hsu

(57) ABSTRACT

A network server provides continuous laundry services for articles of wear. Each article has a unique article identifier. The server has a customer database for associating each customer with a unique customer identification; a message server for sending electronic messages to customers; an article database; a service catalog for indicating available article-related services to the customer; an order database for tracking a process status of the article according to the article identifier, and a last-serviced database for tracking a regular service requirement of the article according to the article identifier. The network server uses the last-serviced database, the customer database, and the message server to send an electronic reminder message to the customer when a service time for the article is exceeded. The customer can use the server to inquire about the current process status of an article, and place a new order for the cleaning of an article.

26 Claims, 15 Drawing Sheets

Registration

Name: ☐
Desired login name: ☐
Password: ☐
Address: ☐
City: ☐
E-mail address: ☐

Field

⊙ Semiconductor   ⊙ Bio-engineering
⊙ Medical         ⊙ Pharmaceutical
⊙ Optics          ⊙ Cosmetics
⊙ Other

[ Done ]

Fig. 5

Charges

Coveralls (6R-2799A) Class "A" cleaning   $30.00
Drop off + 2 days: (6/09/01)

Hood (9H-2799A) Contamination analysis   $90.00
Drop off + 2 days: (6/09/01)

Total:  $120.00

[ Accept ]   [ Cancel ]

Fig. 9

To: John Doe (Jdoe@somewhere.com)
From: Mail server @laundry service. com
Re: Cleaning reminder Dear John Doe:
Your gloves, article number CG-9792Q, require cleaning.

Fig. 14

NETWORK SERVER FOR SERVICING ARTICLES OF WEAR

BACKGROUND OF THE INVENTION

1. Field of the Invention

The present invention relates to a network server. More specifically, the present invention discloses a network server for providing continuous cleaning services for articles of wear to a customer, such as offering messages that provide cleaning time reminders.

2. Description of the Prior Art

In many fields of production and research, a high degree of cleanness is required in the lab or processing environment, and specialized articles of wear are used by technicians and engineers within the environment to maintain this state of cleanness. This is especially true in the field of semiconductor manufacturing, but also extends to biotechnology, and to lesser degrees, precision optics, pharmaceuticals and medicine.

The cleaning and servicing of these articles is specialized and is performed either in-house, or contracted out to a third party. In either case, it is the responsibility of the user of the article to ensure that the article is sent off to the cleaning and servicing house at appropriate intervals to guarantee the article is sufficiently clean and in proper condition to protect the integrity of the lab environment. That is, after a certain number of hours worn, each article must be cleaned and serviced to avoid contamination of the clean room environment from the article itself. Different lab environments require different cleanness standards from the articles, with correspondingly higher or lower cleaning costs associated with the stringency of the cleanness standard. The cleaning and servicing house must always be appraised of this required standard when undertaking the cleaning of the article to ensure that, on the one hand, the cleanness of the lab environment is maintained, while on the other hand avoiding excessive and unnecessary cleaning and servicing costs.

As the responsibility for regular servicing, and the type of service, for the article is upon the user of the article, it is not uncommon for cleanness protocols to be violated. Users, unmindful of the last servicing date of the article, unwittingly contaminate clean room environments by wearing dirty, or unsuitable, articles into the lab.

SUMMARY OF THE INVENTION

It is therefore a primary objective of this invention to provide a network server that offers continuous servicing of specialized articles that require a high degree of cleanness. The server tracks each article by way of a unique article identifier to ensure that a proper servicing process is performed for each article, and that the user of an article is reminded, via a message, when the article requires servicing.

The present invention, briefly summarized, discloses a network server for providing continuous services for articles of wear to a customer on a client computer. Each article has a unique article identifier. The server has a customer database for associating each customer with a unique customer identification; a message server for sending electronic messages to customers; an article database for cataloging an article according to the article identifier on the article, and for associating the article with the customer identification; a service catalog for indicating available article-related services to the customer; an order database for tracking a process status of the article according to the article identifier, and a last-serviced database for tracking a regular service requirement of the article according to the article identifier. The network server uses the last-serviced database, the customer database, and the message server to send an electronic reminder message to the customer when a service time for the article is exceeded. The customer can use the server to inquire about the current process status of an article, and place a new order for the cleaning or servicing of an article.

It is an advantage of the present invention that the network server sends electronic reminders to the user of an article when a servicing day for the article is approaching, or is overdue. This reminder service helps to avoid unnecessary contamination of the lab environment in which the article is used. Furthermore, a customer can place cleaning orders with the server, and receive results from specialized cleaning services, such as contamination analysis results and damage repairs. Finally, as each article is tracked by the unique article identifier on the article, consistent cleaning processes are insured for each article, and the cleaning process status of the article can be offered on a real-time basis to the customer by way of the server.

These and other objectives of the present invention will no doubt become obvious to those of ordinary skill in the art after reading the following detailed description of the preferred embodiment, which is illustrated in the various figures and drawings.

BRIEF DESCRIPTION OF THE DRAWINGS

FIG. 5 is an example customer information entry form of the present invention.

FIG. 9 is an example of a charges web page generated according to the present invention.

FIG. 14 is an example of an electronic reminder message generated by the server of the present invention.

DETAILED DESCRIPTION OF THE PREFERRED EMBODIMENT

Figure 1:
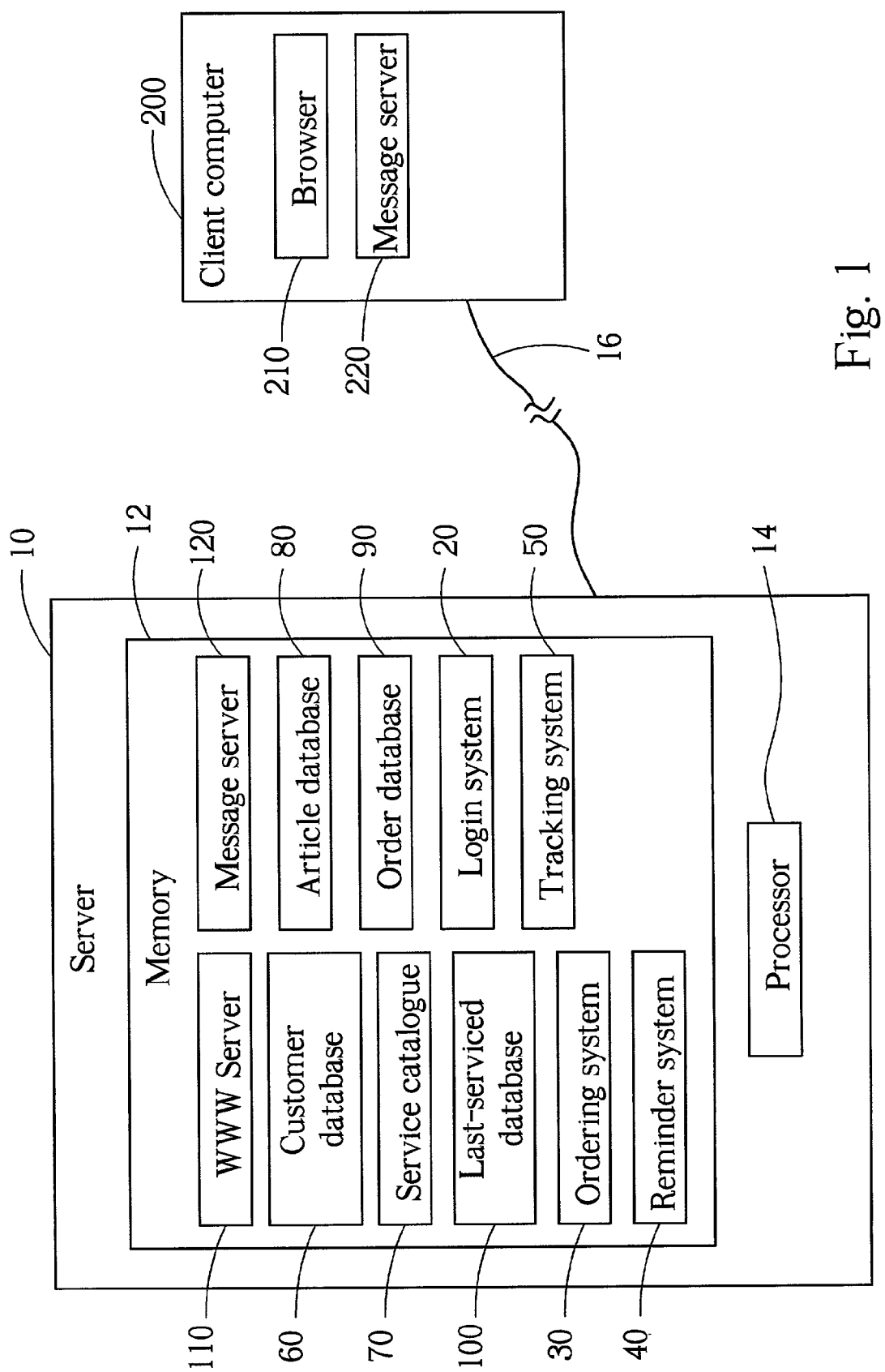
FIG. 1 is a block diagram of a network server according to the present invention.

Please refer to FIG. 1. FIG. 1 is a block diagram of a network server 10 according to the preferred embodiment of the present invention. The network server 10 comprises a memory 12 and a processor 14. The memory 12 is used to hold code and data for the server 10, and comprises working memory, such as dynamic random access memory (DRAM), for the processor 14, and permanent storage memory. The processor 14 executes the code in the memory 12. The code in the memory 12 includes a login system 20, an ordering system 30, a reminder system 40 and a tracking system 50. The data in the memory 12 includes a customer database 60, a service catalogue 70, an article database 80, an order database 90 and a last-serviced database 100. The memory 12 also includes a World Wide Web (WWW) server 110 and a message server 120. The server 10 communicates with a client computer 200 through a network 16. The network 16 can be an Intranet, a wide area network (WAN), the Internet, or any other suitable network.

The client computer 200 comprises a browser 210 and a message server 220. A customer (not shown) on the client computer 200 uses the browser 210 to access the server 10 across the network 16. The browser 210 interfaces in a known manner with the WWW server 110 to enable the customer to utilize the functionality of the server 10. Specifically, the WWW server 110 sends web pages (not shown in FIG. 1) to the browser 210 across the network 16. The browser 210 processes these web pages 210 and presents them to the customer. The customer can place information into these web pages, and the browser 210 can send this information back to the WWW server 110 for processing by the server 10. Similarly, the message server 120 on the server 10 can send an electronic message, such as an e-mail message, to the message server 220 on the client computer 200. The mail server 220 processes these electronic messages and presents them to the customer. Although only a single client computer 200 is shown connected to the server 10, it should be understood that a plurality of such client computers 200 may interface with the server 10 across the network 16. For the sake of simplicity, though, in the ensuing discussion, only a single client computer 200 is considered.

Figure 2:
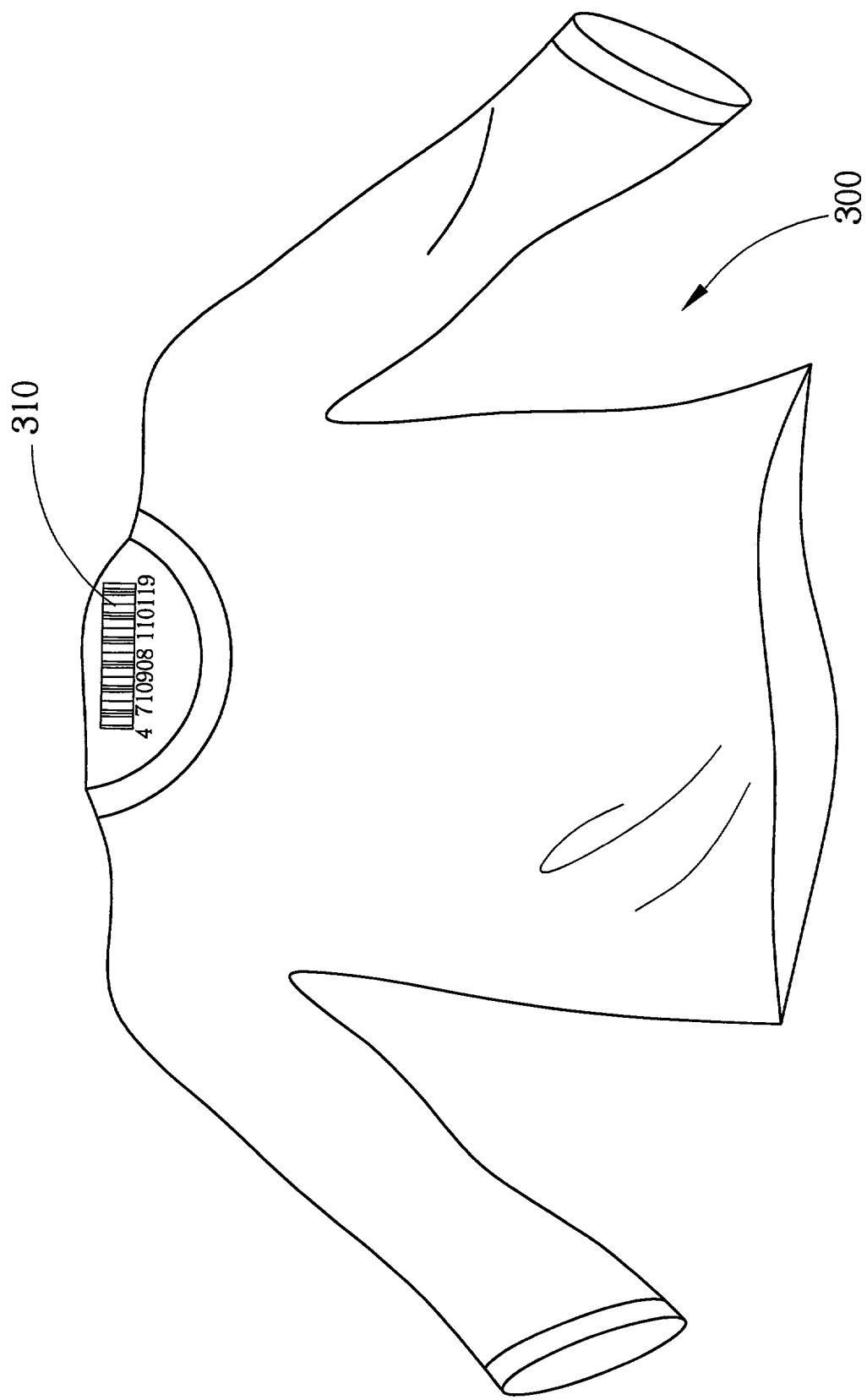
FIG. 2 is a diagram of a sample article of wear of the present invention that requires cleaning.

Please refer to FIG. 2 in conjunction with FIG. 1. FIG. 2 is a diagram of a sample article of wear 300 that requires cleaning. The article 300 is a specialized garment that is used in environments that require a high degree of cleanness, such as a semiconductor fabrication laboratory. The article 300 is a high-value article of wear, and requires special cleaning considerations and servicing procedures. Of course, many types of such articles may be used, and thus the exact shape or form of the article 300 is of no concern to the present invention. What is critical, though, is that the article 300 has a unique identification 310. The article identification 310 is unique for every article 300. For ease of use, the article identification 310 shown in FIG. 2 is of a barcode type, which may be readily scanned by a barcode reader. Other systems, such as a simple string of digits that may be read and hand entered into a computer or terminal are also possible.

Figure 3:
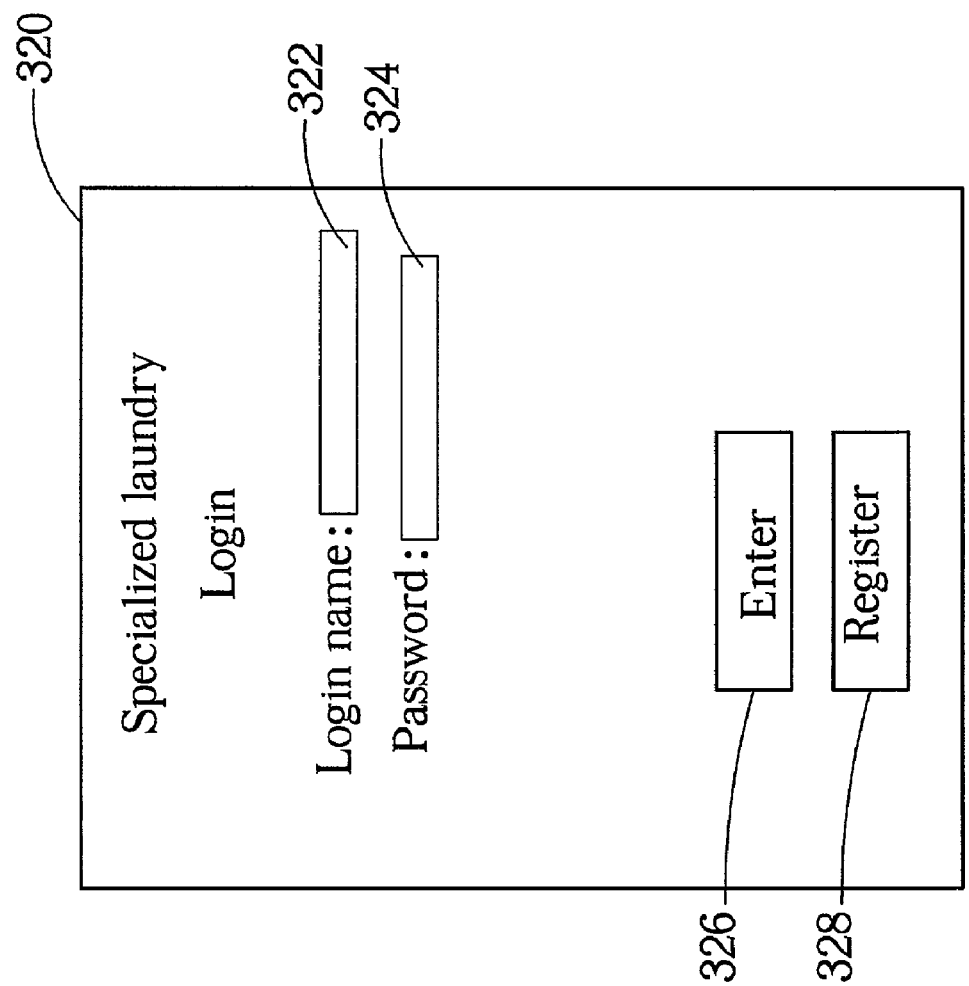
FIG. 3 is an example login web page of the present invention.

Please refer to FIG. 3. FIG. 3 is a sample login web page 320 of the present invention. To properly identify each customer, the login system 20 is used. At the beginning of a session with the client computer 200, the WWW server 110 activates the login system 20. The login system 20 sends a login web page 320 to the browser 210 on the client computer 200. Using the client computer 200, the customer types in a login name 322 and a password 324. Clicking upon an "Enter" button 326 instructs the browser 210 to send the login name 322 and password 324 to the server 10.

Figure 4:
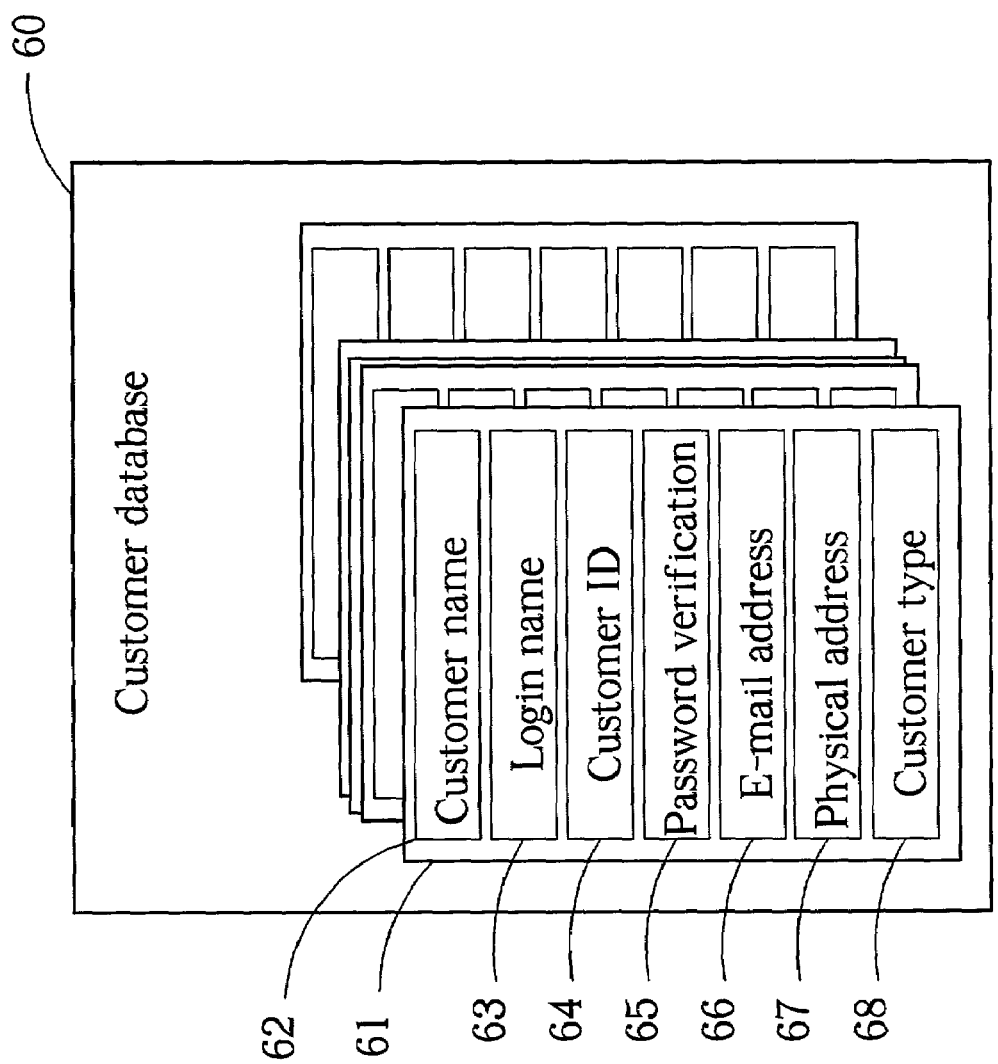
FIG. 4 is a block diagram of customer database of the present invention.

Please refer to FIG. 4. FIG. 4 is a block diagram of the customer database 60. The customer database 60 comprises a plurality of entries 61. Each entry 61 contains information about a customer, and includes a customer name field 62, a login name field 63, a customer identification (ID) field 64, a password verification field 65, a message address field 66, a physical address field 67 and a customer type field 68. The customer name field 62 is used to hold the full name of the customer. The login name field 63 is used to hold the login name 322 that the customer uses for the login system 20. The customer ID field 64 holds a unique identification value for each customer, which is used internally within the server 10 to identify the customer. The password verification field 65 is used to verify the password 324 used by the customer for the login system 20, and is preferably a salted, encrypted form of the password 324 used by the customer. The message address field 66 holds an electronic address that is used when sending any electronic messages to the customer, and may be the e-mail address of the customer. The physical address field 67 holds the physical address of the customer, either business or personal. Finally, the customer type field 68 is used to indicate the field in which the customer is involved, i.e., semiconductor, bioengineering, pharmaceutical, etc.

Upon obtaining the login name 322 and password 324 from the browser 210, the login system 20 parses through the customer database 60 looking for an entry 61 with a login name field 63 that matches the login name 322. Once found, the password 324 is verified against the password verification field 65, and if the verification is successful, then the login procedure is complete. The customer ID 64 is then used to identify the customer on the client computer 200, and a laundry service web page 340 (shown in FIG. 6) is sent to the client computer 200.

A new customer may register with the server 10 by clicking upon a "Register" button 328 on the login web page 320. Please refer to FIG. 5. FIG. 5 is a customer information entry form 330 that is sent to the browser 210 by the login system 20 when the browser 210 indicates that the "Register" button 328 has been clicked. The customer fills in the customer information entry form 330 and then clicks on the "Done" button 332. The information from the customer information entry form 330 is then sent to the server 10 by the browser 210. The login system 20 parses the information from the customer information entry form 330, and generates a new entry 61 in the customer database 60 based upon the data from the customer information entry form 330. A unique customer ID 64 is supplied to the new entry 61, and the login procedure for the new customer is then complete.

Figure 6:
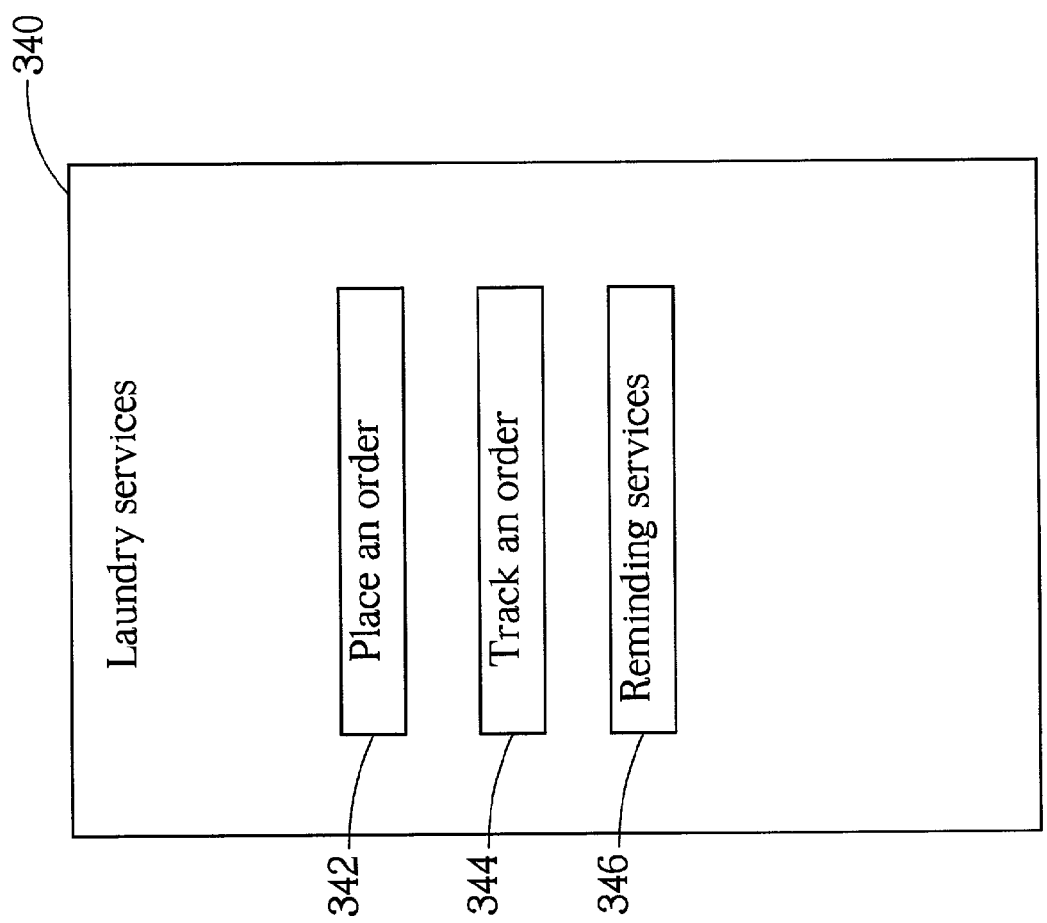
FIG. 6 is an example laundry service web page of the present invention.

Please refer to FIG. 6. FIG. 6 is a diagram of a laundry service web page 340 that is sent to the client computer 200 by the server 10 upon the successful completion of a login procedure of the login system 20. By clicking upon a "Place an order" button, the customer indicates that he or she wishes to have an article of wear 300 cleaned. By clicking on a "Track an order" button 344, the customer indicates that the current process status of an article 300 being cleaned or serviced is desired. Finally, the "Reminding services" button 346 enables the customer to change the interval length between electronic message reminders when an article 300 is due to be cleaned.

Figure 7:
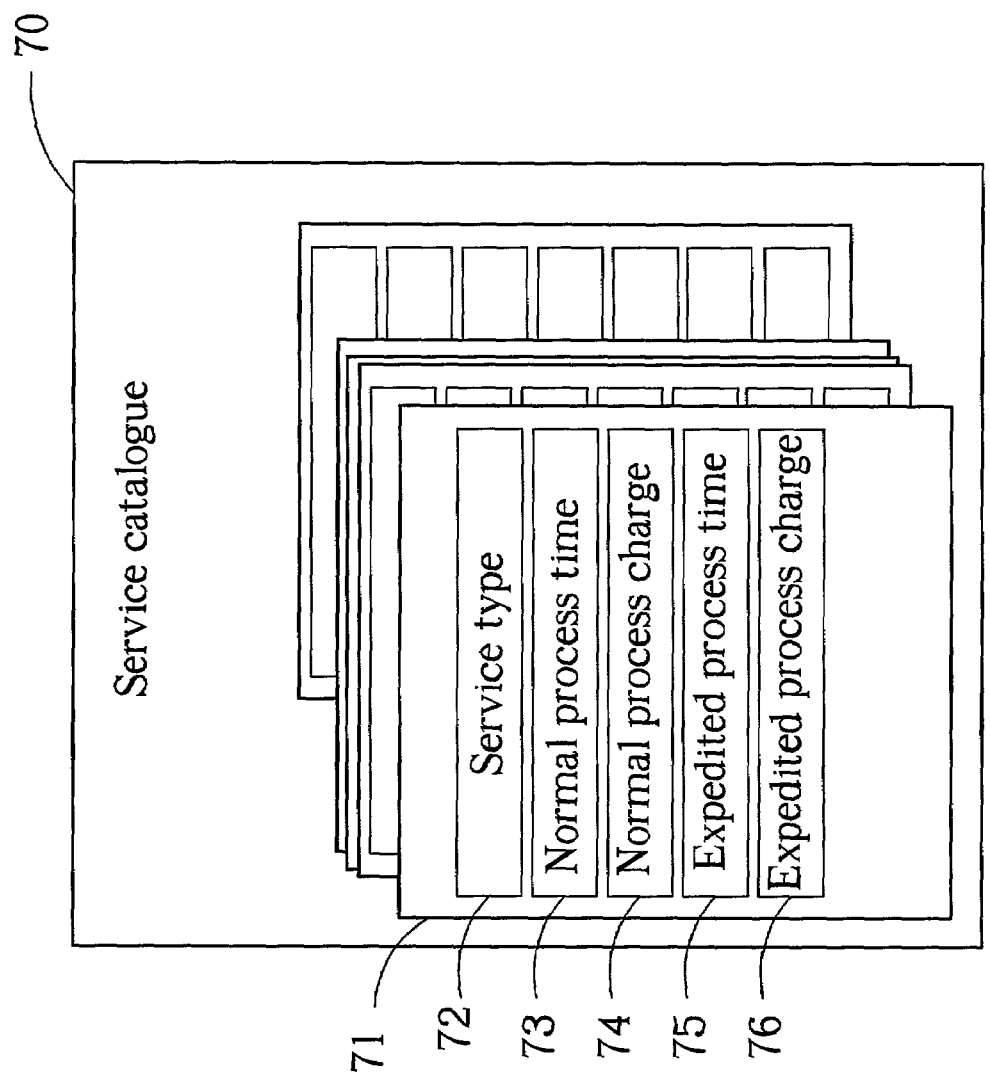
FIG. 7 is a block diagram of a service catalogue of the present invention.

Please refer to FIG. 7. FIG. 7 is a block diagram of the service catalogue 70. The service catalogue 70 contains a plurality of entries 71. Each entry 71 contains data about a particular service offered by the server 10 for articles 300. The entries 71 each include a service type field 72, a normal process time field 73, a normal process charge field 74, an expedited process time field 75 and an expedited process charge field 76. The service type field 72 is used to indicate the type of article-related services offered, such as a type of cleaning, mending, or a contamination analysis. As noted above, different types of articles 300 maybe used in different conditions that require differing cleanness standards. Such different cleanness standards, in turn, require different cleaning processes for the article 300. These different processes are indicated in the service type field 72. The normal process time field 73 indicates how long the process indicated in the service type field 72 will take. Similarly, the normal process charge field 74 indicates the amount of money that will be charged to the customer for the service. In the event that the service indicated in the service type field 72 can be expedited, the expedited process time field 75 indicates that amount of time that will be required for the expedited process, and the expedited process charge field 76 indicates that amount of money that will be charged for the expedited process.

Figure 8:
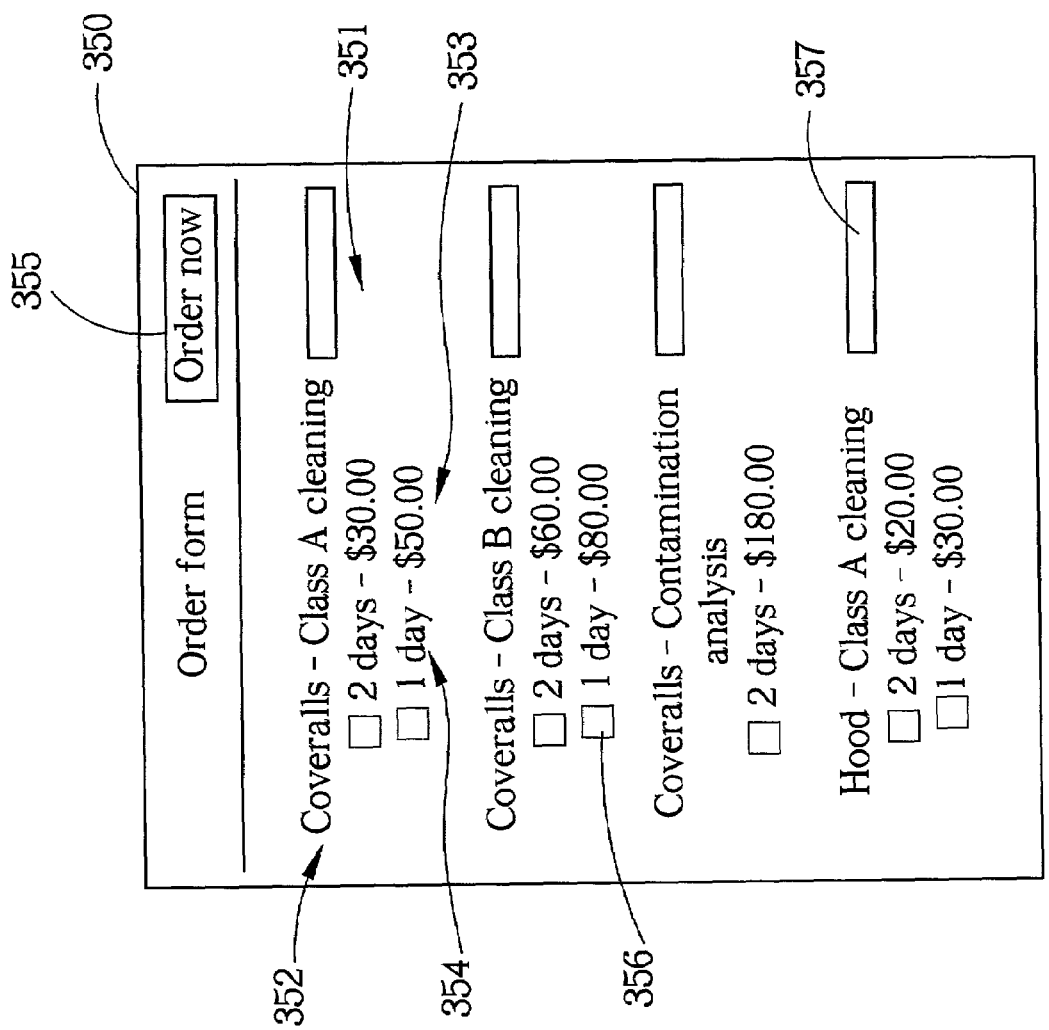
FIG. 8 is an example of a laundry service order form of the present invention.

Please refer to FIG. 8. FIG. 8 is a diagram of a laundry service order form 350 generated by the ordering system 30 and sent to the client computer 200 when the customer clicks on the "Place an order" button 342 of the laundry services web page 340. When the customer clicks on the laundry services web page 340 displayed in the browser 210, the browser 210 sends a signal indicative of this to the server 10. The server 10 then activates the ordering system 30. The ordering system 30 parses the service catalogue 70 to generate the laundry service order form 350. For each item in the service catalogue 70, the ordering system 30 generates an appropriate listing 351. The listings 351 enable the customer to place a laundry order with the server 10. Each listing 351 includes a title 352 that corresponds to the service type 72 of the entry 71 in the service catalogue 70, and the corresponding charges 353 and service times 354 for the service. By checking boxes 356, the customer is able to order a particular type of service, which is either normal or expedited. The customer may also use the boxes 357 to fill in the article identification 310 of the article 300 for which the service is requested. When the customer clicks on the "Order Now" button 355, the browser 210 sends the laundry order service information indicated by the checked boxes 356 to the server 10.

Please refer to FIG. 9. FIG. 9 is a diagram of a charges web page 360 generated by the ordering system 30 and sent to the client computer 200 after receiving laundry order service information from the laundry service order form 350. The ordering system 30 uses the information from the checked boxes 356, the article identification boxes 357 and the service catalogue 70 to build the charges web page 360. The charges web page 360 simply confirms the desired services with the customer, indicates a total price for the services, and when the services can be expected to be completed. For example, in FIG. 9, the customer has ordered a class "A" cleaning for a pair of coveralls, which have an article identification number of 6R-2799A, and a contamination analysis of a hood with an article identification number of 9H-2799A. The ordering system 30 uses the service catalogue 70 to find the prices for these services, which are $30.00 and $90.00, respectively, and the time required to perform these services, both of which require two days. A pickup date for each article 300 is indicated, which is Jun. 9, 2001, and a total price for the desired services, which is $120.00. If the customer clicks on the "Accept" button 362, the ordering system 30 will add the laundry order to the order database 90 and the customer will be billed for the services to be rendered. By clicking on the "Cancel" button 364, the ordering system 30 ignores the request and instead sends the laundry service order form 350 back to the client computer 200.

Figure 10:
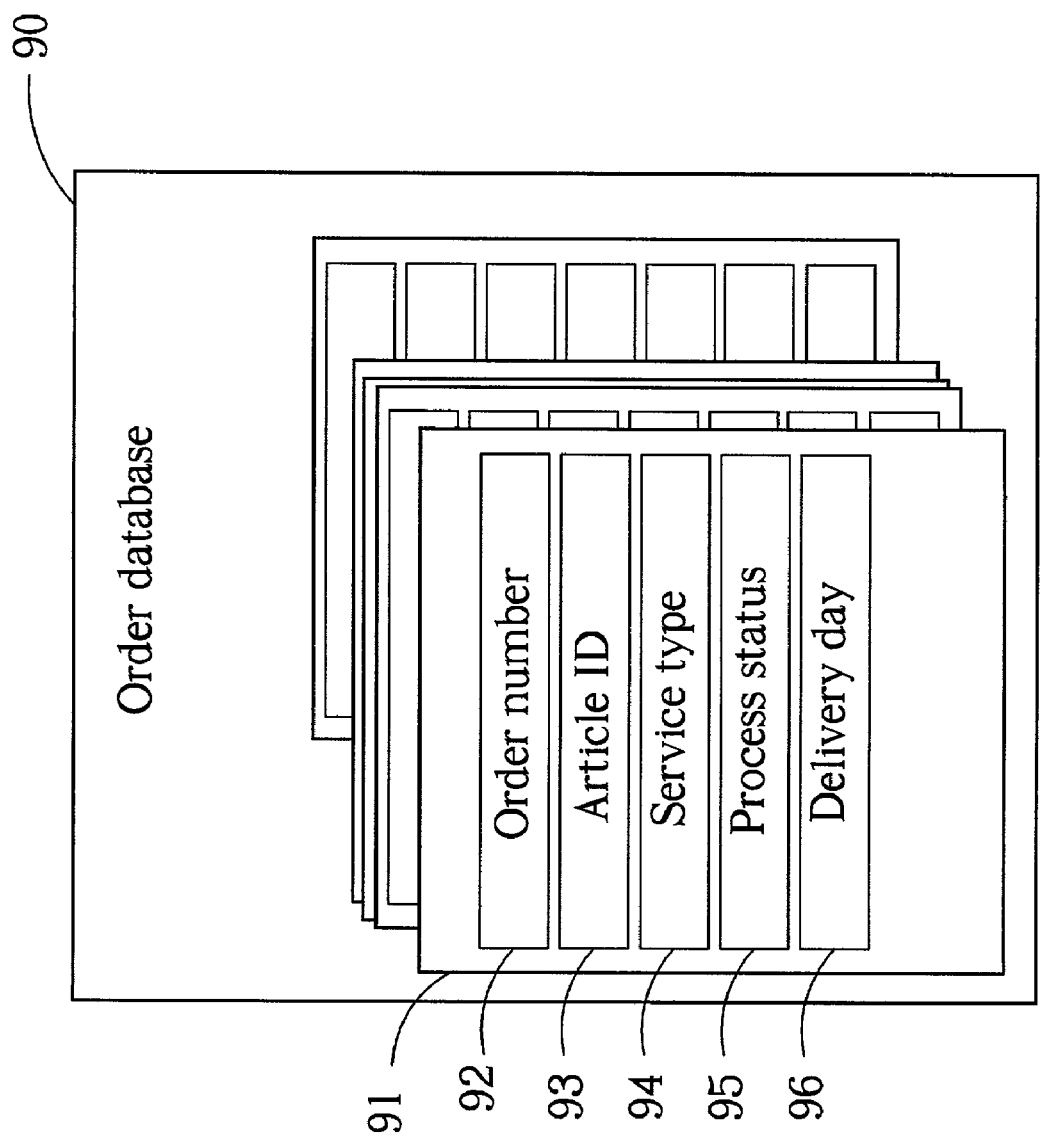
FIG. 10 is a block diagram of an order database of the present invention.

Please refer to FIG. 10. FIG. 10 is a block diagram of the order database 90. The order database 90 comprises a plurality of entries 91. Each entry 91 is for a laundry service order for a particular article of wear 300. Each entry 91 comprises an order number field 92, an article ID field 93, a service type field 94, a process status field 95 and a delivery day field 96. Upon acceptance of the laundry order by the customer, the ordering system 30 generates a unique order number. The ordering system 30 also generates an entry 91 in the order database 90 for each service ordered as indicated in the charges web page 360. The order number field 92 holds the unique order number for the laundry order. The article ID field 93 holds the article identification number 310 for the article to be serviced. The service type field 94 holds the type of laundry service that is to be performed on the article 300, and is analogous to the service type field 72 in the service catalogue 70. The process status field 95 indicates the current processing status of the article 300, i.e., that it is being washed, mended, undergoing an contamination analysis, is awaiting arrival, is ready to be picked up, etc. Finally, the delivery day field 96 holds the expected service completion date for the article 300. The delivery day field 96 can be modified by the server 10 as the situation demands, for example, if processing delays occur, the article 300 is not dropped off when expected, etc. Similarly, the process status field 95 is updated as the article 300 is serviced.

Figure 11:
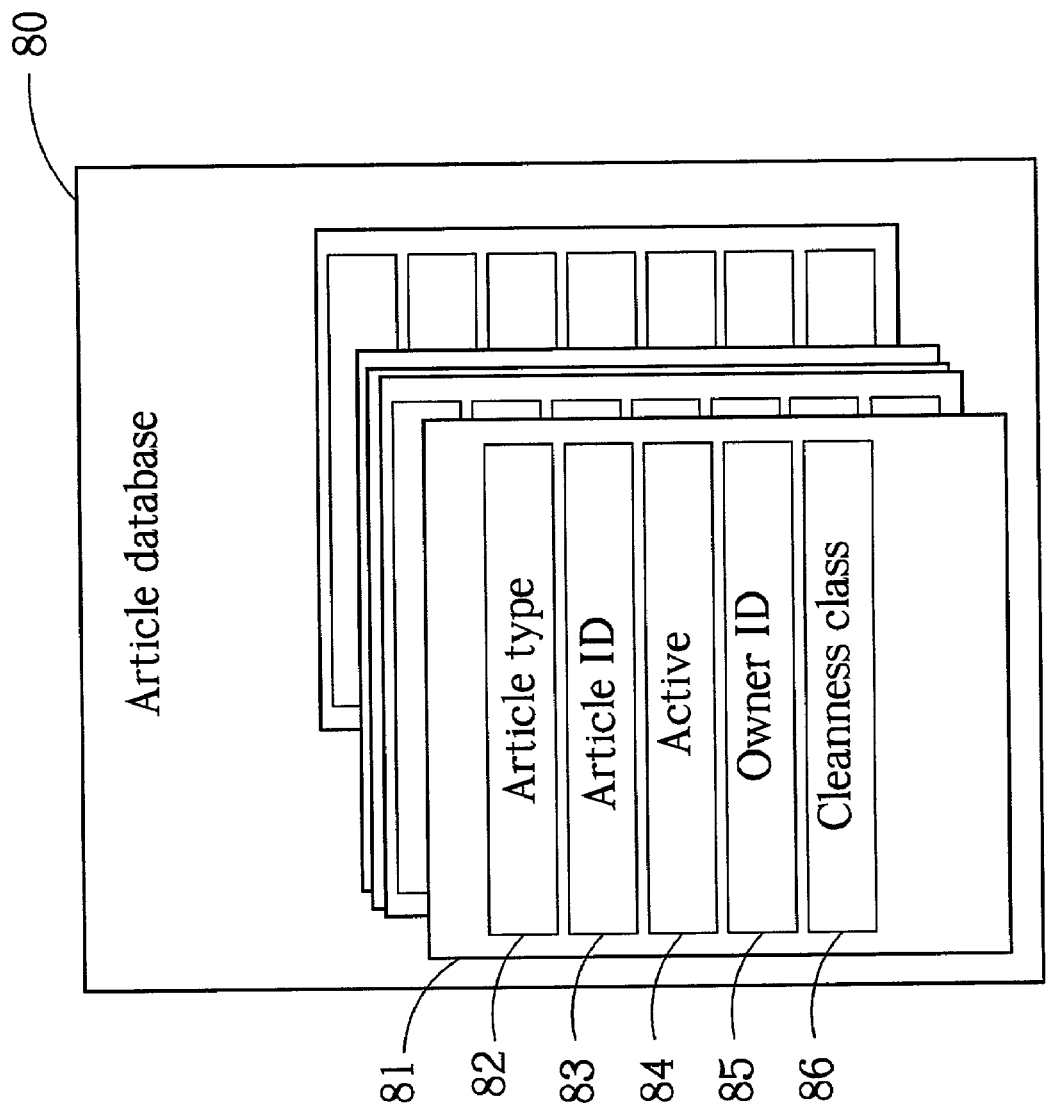
FIG. 11 is a block diagram of an article database of the present invention.

Please refer to FIG. 11. FIG. 11 is a block diagram of the article database 80. Just as each customer is tracked by the customer database 60, so too is each article 300 tracked by the article database 80. The article database 80 comprises a plurality of entries 81. Each entry 81 is for an article 300 uniquely identified by the article ID 310. Each entry 81 comprises an article type field 82, an article ID field 83, an active field 84, an owner ID field 85 and a cleanness class field 86. The article type field 82 indicates an article type, such as a mask, hood, coveralls, gloves, etc. The article ID field 83 is used to hold the unique identification number 310 of the article 300. The active field 84 is used to indicate if the article 300 has been serviced within a certain servicing period. The owner ID field 85 holds the customer ID 64 (from FIG. 4) of the owner of the article 300, and thus enables linking between the article database 80 and the customer database 60. The cleanness class field 86 is used to indicate the required cleanness of the article 300, and thus the type of cleaning process that must be performed for the article 300. When a cleaning order for the article 300 has a service type 94 that does not correspond to the cleanness class 86 for the article 300, a message can be delivered to the customer to warn of the discrepancy. In this manner, the proper cleaning of the article of wear 300 is assured.

Figure 12:
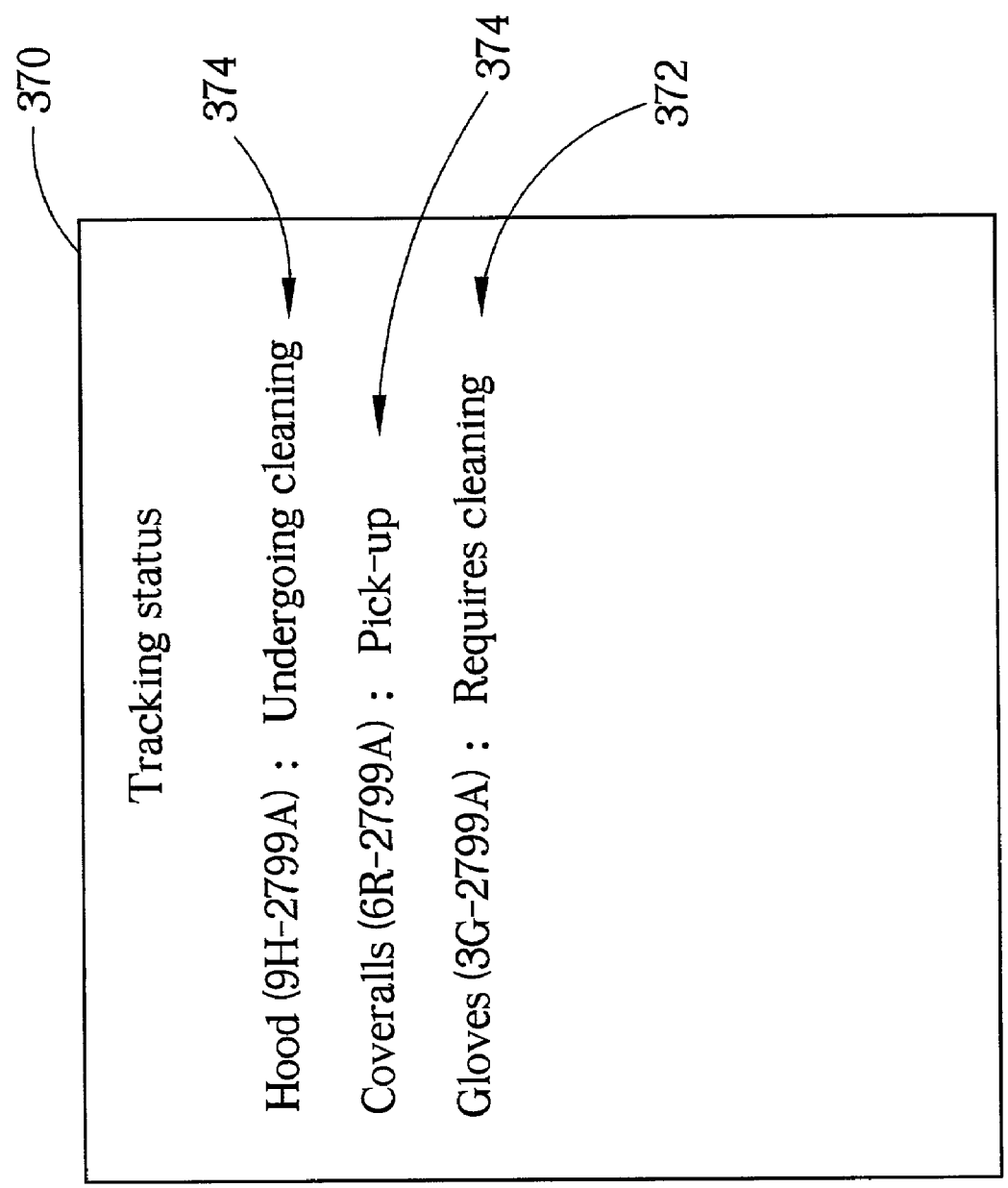
FIG. 12 is an example of a tracking web page of the present invention.

Please refer to FIG. 12. FIG. 12 is a diagram of a tracking web page 370 that is generated by the tracking system 50 and sent to the client computer 200 when the customer clicks on the "Track an order" button 344 of the laundry services web page 340. The tracking system 50 uses the customer ID, as obtained from the login system 20, to search for entries 81 in the article database 80 that have owner ID fields 85 that match the customer ID, thereby obtaining a list of article IDs. If the active field 84 in the article database 80 indicates that the article 300 is overdue for servicing, the tracking web page 370 will have an appropriate entry, as shown for the gloves of entry 372. The list of article IDs from the matching entries 81 is used to search the order database 90 for entries 91 whose article ID fields 93 match the article ID fields 83.

The process status field 95 of matching entries 91 in the order database 90 are used to present tracking information lines 374 in the tracking web page 370. In this manner, the customer can obtain up-to-date process tracking information of articles 300 that are being serviced, as well as being reminded that an article 300 may need servicing. Note that the entries 91 in the order database 90 could each optionally comprise a customer ID field. In this case, there would be no need to use the article database 80 as a look-up reference for the tracking system 50. Instead, the tracking system 50 could directly search the customer ID fields in the entries 91 of the order database 90 against the customer ID from the login system 20 to find matching entries and to build the tracking web page 370.

Figure 13:
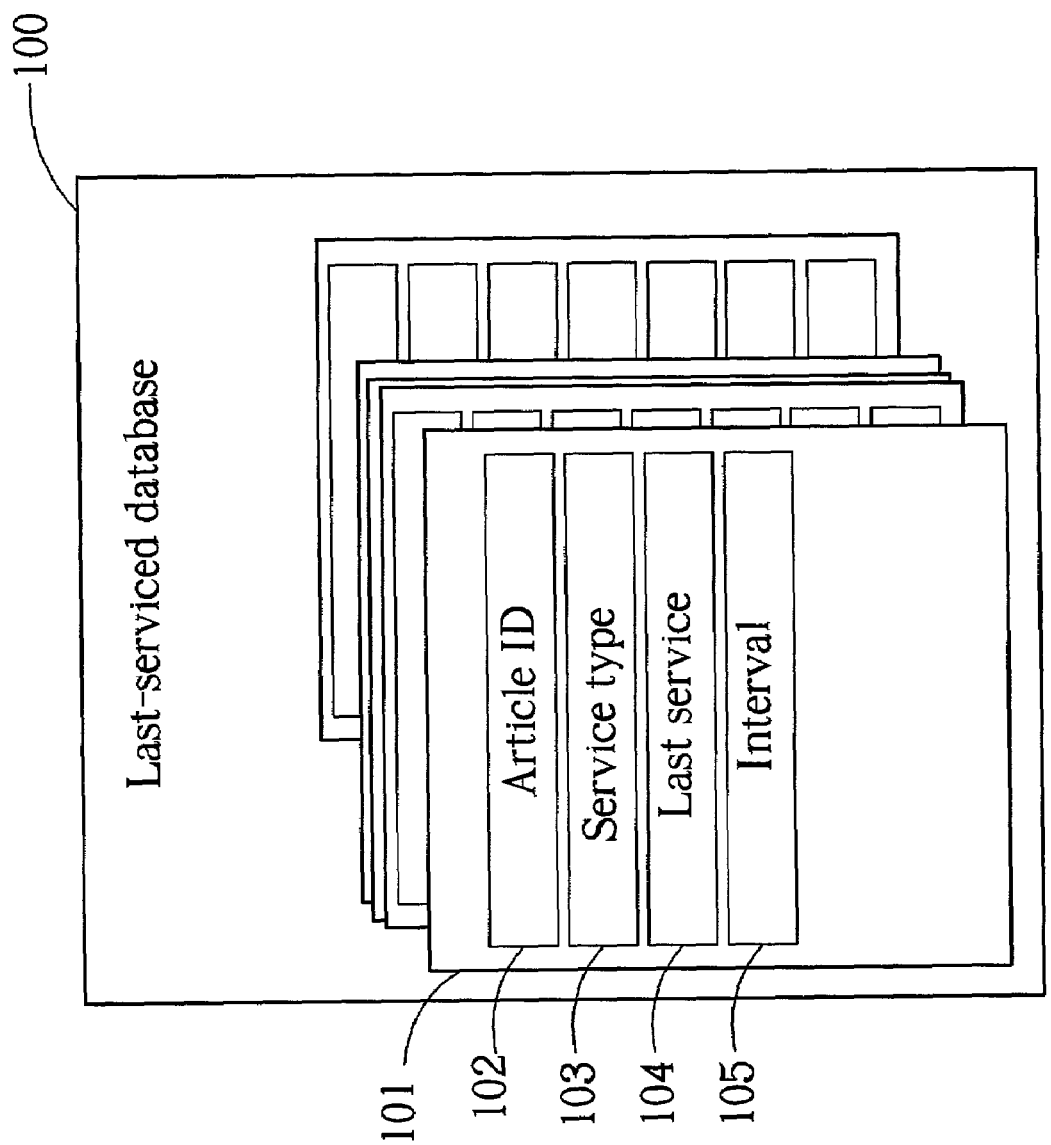
FIG. 13 is a block diagram of a last-serviced database of the present invention.

Please refer to FIG. 13. FIG. 13 is a block diagram of the last-serviced database 100. The last-serviced database 100 and the reminder system 40 are of key importance to the present invention as they enable the server 10 to generate and send an electronic reminder message to the customer when a service time for the article of wear 300 is exceeded. The last-serviced database 100 comprises a plurality of entries 101. Each entry is for a service requirement of an article 300 and comprises an article ID field 102, a service type field 103, a last service field 104 and an interval field 105. The last service field 104 and the interval field 105 together comprise service time data that enable the reminder system 40 to determine when a servicing time of the article 300 has been exceeded. The article ID field 102 holds the unique article identification value 310 for the article 300. The service type field 103 indicates the type of service that is to be performed, and is analogous to the service type field 72 in the service catalogue 70. The last service field 104 holds the date when the article 300 last obtained servicing of the type indicated in the service type field 103. Finally, the interval field 105 holds a time interval, after which the article 300 must again be serviced. For example, if the interval field 105 holds a value of 7 days, and the last service field 104 holds a date of Mar. 7, 2001, then the article of wear 300 should next be serviced on or before Mar. 14, 2001. Periodically, for example on a half-day basis, the reminder system 40 scans the last-serviced database 100, looking for any entries 101 that indicate that an article 300 requires servicing. For entries 101 that are found to require servicing, the article ID field 102 is used to look up the article 300 in the article database 80, to set the active field 84 in the article database 80 to indicate that the article 300 requires servicing, and to obtain the article type from the article type field 81. Additionally, the customer ID of the owner of the article 300 is obtained from the article database 80, and this customer ID is used to search the customer database 60 for the corresponding electronic address and proper name of the customer. The reminder system 40 generates an electronic message to remind the customer that the article 300 requires servicing, and instructs the message server 120 to send the electronic message to the electronic address. An example of such an electronic message 380 is depicted in FIG. 14. In this manner, customers are reminded of any articles of wear 300 that may require servicing, and are thus less likely to accidentally contaminate clean room environments.

Figure 15:
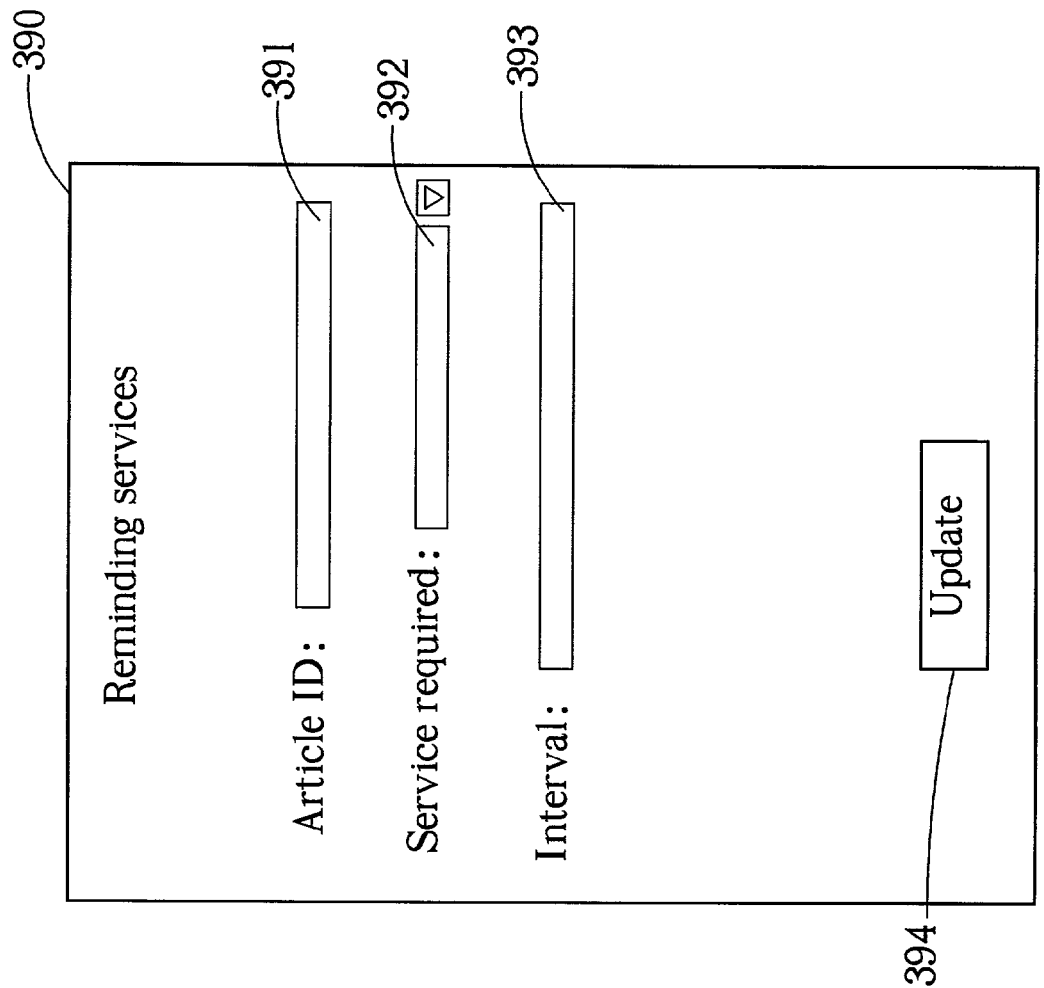
FIG. 15 is an example of a reminding services web page of the present invention.

Please refer to FIG. 15. FIG. 15 is a diagram of a reminding services web page 390. When the customer clicks on the "Reminding services" button 346 of the laundry services web page 340, the reminder system 40 sends the reminding services web page 390 to the client computer 200. By filling in the article ID field 391, service required field 392 and interval field 393, and then clicking on the "Update" button 394, the customer can make appropriate changes to the last-serviced database 100.

Finally, it should be noted that in the preferred embodiment of the present invention, the service catalogue 70 offers a contamination analysis service to the customer, as indicated in the web pages of FIG. 8 and FIG. 9. This contamination analysis procedure is a specialized function of the cleaners. Once the results of the contamination analysis are available, they are entered by the cleaning personnel into the server 10, and the server 10 forwards these results to the customer by way of an electronic message. Other services may also be offered, such as the mending of rips, replacement of damaged items on the article of wear 300, and so forth. For each service, an electronic message may be sent to the customer to indicate the action performed, and the results of the action.

In contrast to the prior art, the present invention provides a server that offers continuous tracking and electronic message reminder services for high-value articles of wear that require specialized cleaning and servicing. By tracking the servicing dates, and required servicing intervals, for each article of wear, the server is able to determine when an article should next be serviced, and what that service should be. To facilitate these tracking and reminding services of the server, each article is labeled with a unique article identification number.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A network server for providing continuous laundry services for articles of wear to a customer on a client computer, the server comprising:
   a plurality of article identifiers, each of the article identifiers attaching to each of the articles;
   a customer database for associating the customer with a customer identification;
   a message server for sending a message to the customer;
   a service catalog for indicating available article-related services to the customer;
   an order database for tracking a process status of an article according to the corresponding article identifier; and
   a last-serviced database for tracking a regular service requirement of the article and tracking whether a service time for the article to be serviced is exceeded or not according to the article identifier, the last-serviced database comprising a last service field for holding the time when the article last obtained a specific servicing, and an interval field for holding a time interval after which the article must again obtain the specific servicing, the last service field and the interval field together comprising the service time for the article to be next serviced to enable the last-serviced database to track whether the service time is exceed or not;
   wherein the network server uses the last-serviced database and the message server to send a message to the customer when the service time for the article is exceeded, and uses the order database to enable the customer to track the process status of the article.

2. The network server of claim 1 further comprising a login system; wherein the login system obtains a login name and a login password from the customer, the login system uses the customer database, the login name, and the login password to obtain the customer identification, and after obtaining the customer identification, the server sends a laundry service page to the client computer.

3. The network server of claim 2 wherein the customer database comprises at least an entry for the customer, and the entry comprises a login name field for identifying the login name of the customer, a customer identification field for obtaining the customer identification of the customer, a password verification field for verifying the login password from the customer, and an address of the customer, the message server sending the message to the address.

4. The, network server of claim 3 further comprising a reminder system for sending the reminder message to the customer when the service time for the article is exceeded, the reminder system using the last-serviced database to generate the message, and the customer database to obtain the address for the message.

5. The network server of claim 4 wherein the last-serviced database comprises a plurality of entries, each entry for a serviced article and comprising an article identification field for holding an article identification of the serviced article, and service time data to enable the reminder system to determine when a servicing time for the serviced article is exceeded.

6. The network server of claim 3 wherein if the login system identifies a new customer, the login system sends a customer information entry form to the client computer to obtain customer information from the new customer, and the login system uses the customer information to create a new entry in the customer database.

7. The network server of claim 2 further comprising an ordering system, and the laundry service page enables the customer to access the ordering system; wherein the ordering system uses the service catalog and generates a service order form that is sent to the client computer to enable the customer to place a service order.

8. The network server of claim 7 wherein the ordering system obtains service information from the customer using the service order form, uses the service catalog and the service information to generate a charges page, the charges page having a service charge for the order, and sends the charges page to the client computer; wherein the charges page enables the customer to accept the order or to cancel the order, and the ordering system adds a new entry to the order database if the customer accepts the order.

9. The network server of claim 8 wherein the order database comprises a plurality of entries, each entry for an article to be serviced and comprising an article identification field for holding an article identification for the article to be serviced, and a process status field for indicating a current process status of the article to be serviced.

10. The network server of claim 2 further comprising:
a tracking system; and
an article database for cataloging an article according to the article identifier on the article, and associating the article with the customer identification;
wherein the service page enables the customer to access the tracking system, and the tracking system uses the customer identification and the article database to obtain a list of article identifications associated with the customer identification, uses the list of article identifications and the order database to obtain process status information, and uses the process status information to send a tracking page to the client computer.

11. The network server of claim 10 wherein the article database comprises a plurality of entries, each entry for a service article and comprising an article identification field for holding an article identification for the service article, and an article owner identification field for holding a customer identification for the service article.

12. The network server of claim 1 wherein the service catalog includes a contamination analysis service for the article; wherein contamination results from the contamination analysis service are delivered to the customer.

13. The network server of claim 1 wherein the message is an electronic mail (e-mail) message.

14. A method for providing continuous laundry services for articles of wear, the method comprising:
tagging each article with a unique article identifier; and
providing a network server for accepting a service order for an article from a client computer, for tracking a process status of the service order, for tracking service time data when the article last obtained a specific servicing, for tracking a servicing time interval after which the article must again obtain the specific servicing, and for sending a message to the client computer when a service time for the article determined by the tracked service time data and the tracked servicing time interval is approaching or is overdue.

15. The method of claim 14 wherein the server comprises:
a customer database for associating a customer on the client computer with a customer identification;
a message server for sending the message to the client computer;
a service catalog for indicating available article-related services to the customer;
an order database for tracking the process status of the article according to the article identifier; and
a last-serviced database for tracking a regular service requirement of the article according to the article identifier.

16. The method of claim 15 wherein the customer database comprises at least an entry for the customer, and the entry comprises a login name field for identifying a login name of the customer, a customer identification field for obtaining the customer identification of the customer, a password verification field for verifying a login password from the customer, and an address of the customer, the message server sending the message to the address.

17. The method of claim 16 further comprising using the last-serviced database to generate the message, and the customer database to obtain the address for the message, and sending the message to the client computer when the service time for the article is approaching or is overdue.

18. The method of claim 17 wherein the last-serviced database comprises a plurality of entries, each entry for a serviced article and comprising an article identification field for holding an article identification of the serviced article, and the service time data to enable determination of when the service time for the serviced article is exceeded.

19. The method of claim 15 further comprising detecting a new customer, sending a customer information entry form to the client computer to obtain customer information from the new customer, and using the customer information to create a new entry in the customer database.

20. The method of claim 15 further comprising using the service catalog to generate a service order form that is sent to the client computer to enable the customer to place an order.

21. The method of claim 20 further comprising:
obtaining service information from the customer using the service order form;
using the service catalog and the service information to generate a charges page, the charges page having a service charge for the order;

sending the charges page to the client computer, the charges page enabling the customer to accept the order or to cancel the order; and adding a new entry to the order database if the customer accepts the order.

22. The method of claim 15 wherein the order database comprises a plurality of entries, each entry for an article to be serviced and comprising an article identification field for holding an article identification for the article to be serviced, and a process status field for indicating a current process status of the article to be serviced.

23. The method of claim 15 wherein the server further comprises an article database for cataloging an article according to the article identifier on the article, and associating the article with the customer identification, the method further comprising:

using the customer identification and the article database to obtain a list of article identifications associated with the customer identification;

using the list of article identifications and the order database to obtain process status information; and using the process status information to send a tracking page to the client computer.

24. The method of claim 23 wherein the article database comprises a plurality of entries, each entry for a service article and comprising an article identification field for holding an article identification for the service article, and an article owner identification field for holding a customer identification for the service article.

25. The method of claim 15 wherein the service catalog includes a contamination analysis service for the article, the method further comprising delivering contamination results from the contamination analysis service in a message to the customer.

26. The method of claim 14 wherein the message is an electronic mail (e-mail) message.

* * * * *